Patented Apr. 8, 1930

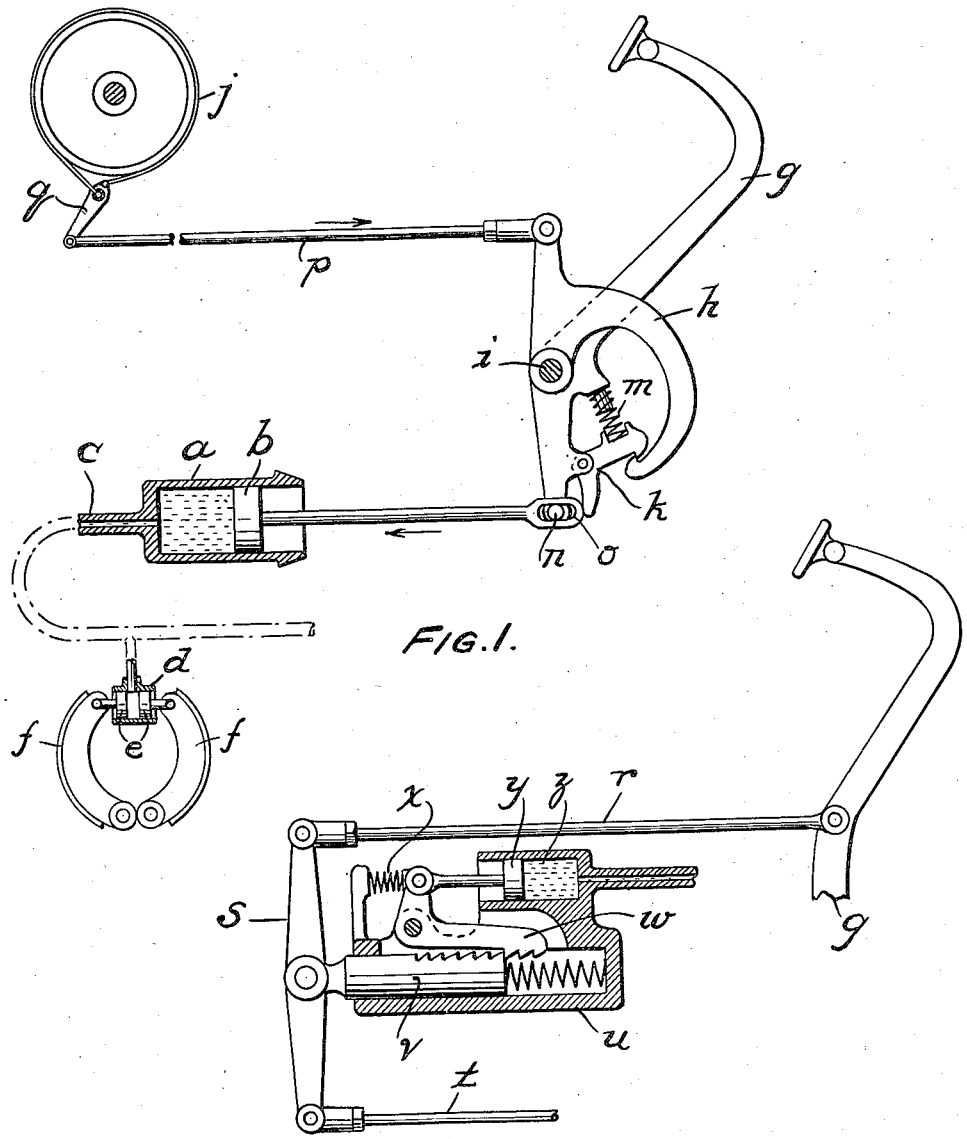

1,753,370

UNITED STATES PATENT OFFICE

ELEUTHERE PAUL DU PONT, OF MONTCHANIN, DELAWARE

AUTOMOBILE BRAKE MECHANISM

Application filed April 21, 1928. Serial No. 271,679.

The invention relates to automobile braking mechanism and particularly to a braking mechanism which comprises an hydraulic brake mechanism adapted to be operated by manual (foot) power and other mechanical emergency brake mechanism also adapted to be operated by the same power.

The object of the invention is to allow the hydraulically operated brake mechanism, when in operative condition, to be operated by transmitting, through the operating fluid, the power of the foot to the brake and to render the emergency brake mechanism inoperative; but to automatically render the mechanical emergency brake mechanism operative, by the same foot power, when the hydraulic brake mechanism is out of order and inoperable to apply the brake.

Embodiments of the invention are shown in the accompanying drawings, in which:—

Fig. 1 is a view, mainly in elevation and partly in section and partly diagrammatic, of braking mechanism embodying my invention.

Fig. 2 is a partial view, partly in elevation and partly in section, of a modification.

The hydraulic brake operating cylinder is operated from a lever $g$ pivoted between its ends at $i$ and having a foot pedal at one end and connected at the other end to a piston $b$ extending into a cylinder $a$. The hydraulically operated brake and the connections between the brake and the cylinder $a$ may be of any known or approved type. As in illustrative connection, there is shown a pipe $c$ connected with a cylinder $d$ having pistons $e$ which operate braking members $f$, which may be, for example, one member of a four wheel braking system of any known construction. It should be understood, however, that my invention does not contemplate maintaining the brake-operating fluid under pressure and opening a valve to allow such pressure to be transmitted to the brake. My invention contemplates the use of a fluid as a means to transmit to the brake, through the hydraulic operating cylinder, the mechanical power applied to a manually operable device, normally a foot pedal.

Pivoted at $i$ between its ends is another lever $h$ having a hooked end normally engaged by a tripping catch lever $k$. The lever $k$ is preferably a bell-crank, one arm of which has a hooked end engaging the hooked end of lever $h$ and the other arm of which engages the end of the rod of piston $b$. The lever $g$ is connected with this piston rod by means of a pin $n$ on the lever engaging a slot $o$ in the rod. Confined between lever $k$ and a projection on lever $g$ is a coil spring $m$.

The other end of lever $h$ is connected, by means of a rod $p$, with an emergency brake, which may be of any approved construction and may comprise, for example, a lever $q$ and a brake band $j$.

In normal operation, when the foot pedal is depressed, the lever $g$, in its free movement before pin $n$ engages the end wall of slot $o$, rocks trip lever $k$ and trips it out of engagement with lever $h$, so that, in the subsequent operation of lever $g$, no operation of lever $h$ and brake rod $p$ occurs. The disengagement of trip lever $k$ against the pressure of spring $m$ occurs because, when the hydraulic mechanism is operating normally, the liquid therein offers a resistance to displacement sufficient to overcome the tension of spring $m$, and the piston $b$, during the movement of pin $n$ in slot $o$, therefore affords a fixed abutment that effects the described tripping of lever $k$ while it is being bodily carried forward by lever $g$. After pin $n$ engages the end wall of slot $o$, the continuing foot pressure on lever $g$ overcomes the normal resistance to movement of the pressure-transmitting fluid and the brake is hydraulically operated.

If, however, the hydraulic system is out of order, the fluid will offer no resistance, or a substantially diminished resistance, to displacement, and, in the initial movement of the foot pedal, the spring pressure on the trip lever $k$ will be sufficient to overcome that diminished resistance, so that piston $b$ will, at the start, be operated by the trip lever, which, by means of spring $m$, will be maintained in engagement with lever $h$. Thereby lever $h$ will be operated and, through rod $p$, will operate the emergency brake.

It will thus be understood that when the hydraulic connection is in good order and is operable to transmit the power of the foot pedal to the hydraulic brake, the mechanical emergency brake connection is inoperative; whereas when the hydraulic connection is out of order and inoperable to transmit the power of the foot pedal, the mechanical emergency brake connection is operated.

The described construction is capable of substantial modification without departing from the principle of the invention. The structure of Fig. 2 is an example of such a permissible modification. The brake lever $g$ may be connected, in the usual manner, with the hydraulic brake mechanism. It is also connected, by means of rod $r$, with one end of a lever $s$. The other end of lever $s$ is connected to a rod $t$, which operates the emergency brake. A plunger $v$, working in a guide $u$, is connected to lever $s$ between the latter's ends. A bell crank lever $w$, pivoted between its ends, has a notched arm adapted to engage notches in plunger $v$ and another arm which is acted on by a spring $x$. The latter arm is connected to the end of a piston $y$, which works in a cylinder $z$. This cylinder has a fluid connection with the fluid for transmitting the power of the brake lever $g$ to the hydraulically operable brake. When the hydraulic brake system is in proper operating condition, some of the fluid therein flows into the cylinder $z$ and pushes piston $y$ against the spring $x$ with sufficient force to compress the spring and hold lever $w$ out of engagement with plunger $v$. Hence, when the rod $r$ is operated, it swings on rod $t$ as a pivot, since there is no resistance to the movement of plunger $v$ in guide $u$. If, however, the hydraulic brake system is out of order, so that little or no resistance is offered to the movement of piston $y$, the tension of spring $x$ moves piston $y$ to the right, thereby swinging lever $w$ into locking engagement with plunger $v$. Hence, in the operation of rod $r$, lever $s$ will swing on the end of plunger $v$ as a pivot and operate the emergency brake rod $t$.

Having now fully described my invention, what I claim and desire to protect by Letters Patent is:

1. The combination, with hydraulic brake mechanism comprising a cylinder, a piston therein and a fluid body adapted to normally resist the movement of said piston, of a manually operable lever and connections therefrom to the hydraulic brake mechanism whereby the latter is operated and said piston moved against the pressure of said fluid body, a mechanical emergency brake mechanism, power transmitting connections between said manually operated lever and the mechanically emergency brake mechanism, and means, operable by said fluid body when offering normal resistance to the movement of said piston, to render the last named connections inoperative to transmit power from said lever to said mechanical emergency brake mechanism.

2. In combination, an hydraulic brake mechanism, a body of fluid arranged to actuate the brake mechanism when under pressure, means for exerting pressure on the body of fluid including a fluid displacing member and a manually operable lever connected thereto to move the member against the pressure of the fluid, a second brake mechanism, connections whereby the second brake mechanism may be actuated by manipulation of the lever, and means acting when the hydraulic brake mechanism is operative to render the connections inoperative upon manipulation of the lever.

3. In combination, an hydraulic brake mechanism, a body of fluid arranged to actuate the brake mechanism when under pressure, means for exerting pressure on the body of fluid including a fluid displacing member and a manually operable lever connected thereto to move the member against the pressure of the fluid, a second brake mechanism, connections whereby the second brake mechanism may be actuated by manipulation of the lever, and means responsive to normal operating pressure of the fluid to render the connections inoperative upon manipulation of the lever.

In testimony of which invention, I have hereunto set my hand, at Wilmington, Del., on this 17th day of April, 1928.

ELEUTHERE PAUL DU PONT.